(No Model.)

C. E. REYNOLDS.
TRUNK FASTENING.

No. 284,899. Patented Sept. 11, 1883.

WITNESSES:
Harry Drury
Hamilton D. Turner

INVENTOR:
Charles E. Reynolds
by his Attorneys
Howson & Sons

UNITED STATES PATENT OFFICE.

CHARLES E. REYNOLDS, OF PHILADELPHIA, PENNSYLVANIA.

TRUNK-FASTENING.

SPECIFICATION forming part of Letters Patent No. 284,899, dated September 11, 1883.

Application filed January 5, 1883. (No model.)

*To all whom it may concern:*

Be it known that I, CHARLES E. REYNOLDS, a citizen of the United States, and a resident of Philadelphia, Pennsylvania, have invented certain Improvements in Trunk-Fastenings, of which the following is a specification.

My invention relates to internal fastenings for the lids of trunks and boxes; and the object of my invention is to so combine a swinging bolt, hook, and retainer with the trunk that the lid can be firmly clamped to the body after the said lid has been closed, and can be readily released when desired.

Figure 1:
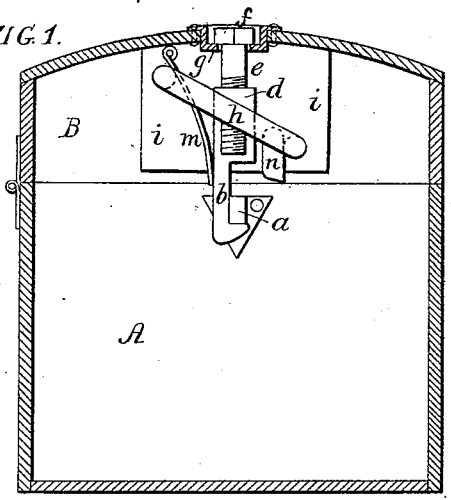
Figure 2:
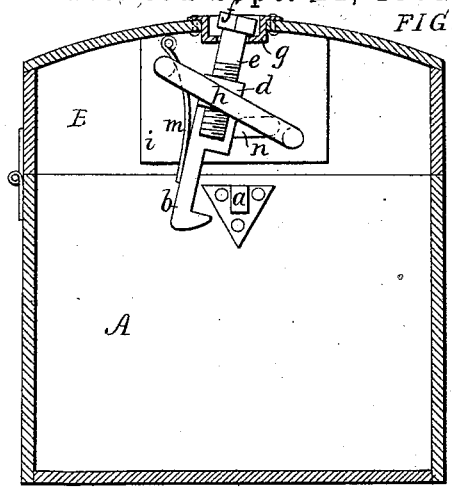
Figure 3:
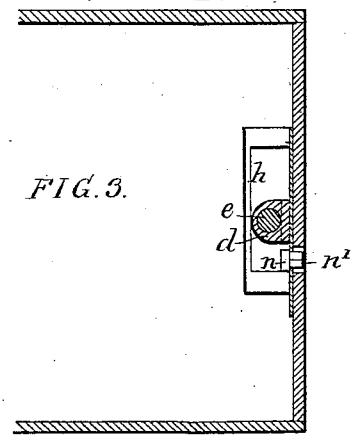

In the accompanying drawings, Figure 1 is a sectional view of a trunk having one form of my improved fastening, and showing the lid secured; Fig. 2, the same with the lid unfastened; Fig. 3, a sectional plan view of part of Fig. 1; and Figs. 4 and 5, sectional views, showing another form of the fastening.

A represents the body, and B the lid, of a trunk or box, the lid being hinged to the body, as usual. To each end of the body of the trunk is secured a retainer, a, to which is adapted a hook, b, a nut, d, on the latter receiving a threaded bolt, e, the head f of which rests in a socket, g, secured to the lid of the trunk. The opening in the socket g is of such size that the hook b is at liberty to swing laterally from and toward the retainer, a yoke, h, on a plate, i, serving to confine the hook longitudinally. When the hooks at the opposite ends of the lid of the trunk engage with the retainers, as shown in Fig. 1, the bolts e are tightened by means of a suitable instrument applied to the heads of the same, and the lid B is thus firmly clamped to the body at each end. When it is desired to release the lid, the bolts are first loosened and the hooks b are then swung back, so as to clear the retainers, as shown in Fig. 2.

In the device shown in Figs. 1 and 2 a spring, m, tends to throw the hook toward the retainer, and a cam, n, the stem n' of which is adapted to an opening in the plate i, serves to throw the hook away from the retainer and to hold it in this retracted position, the cam being operated by means of a suitable key applied to the projecting end of the stem n'.

Figure 4:
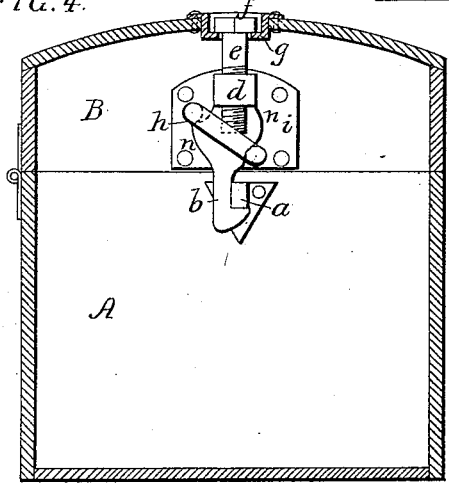
Figure 5:
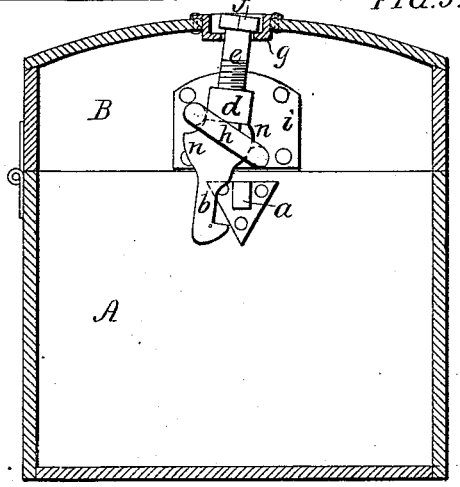

In the device shown in Figs. 4 and 5 cams n are formed on the hook b, and are acted upon by the ends of the yoke h as the hook is raised or permitted to fall on tightening or loosening the bolt e, the cams being such that as the hook falls it is carried away from the retainer, as shown in Fig. 5, the elevation of the hook causing it to again approach and engage with said retainer, as shown in Fig. 4.

Instead of causing the cams n to bear on the end bars of the yoke h, pins on the plate i may be furnished for engaging with the cams.

The devices described provide a secure fastening, the lid being firmly held at each end; and, if desired, a fastening may be placed where the lock is usually located, or an ordinary lock be may used in connection with the end fastenings described.

I claim as my invention—

1. The combination of the body of the trunk or box having the internal retainer, a, with the lid having a socket or bearing, g, the bolt e, loosely hung thereto and projecting through the same, and the hook b, adapted to the retainer and having a nut for the reception of the threaded portion of the bolt e, as set forth.

2. The combination of the body A, having the retainer a, with the lid B, having the bearing or socket g, the bolt e, loosely hung to and projecting through the same, the hook b, having a nut, d, adapted to the bolt, and a guiding-yoke, h, for said hook, as set forth.

3. The combination of the body A, having a retainer, a, with the lid B, having a hook, b, and tightening-bolt e, and a cam adapted to throw the hook out of engagement with the retainer, as set forth.

4. The combination of the body A, having a retainer, a, with the lid B, having a hook, b, with cams n, a bolt, e, and bearings for the cams n, as set forth.

In testimony whereof I have signed my name to this specification in the presence of two subscribing witnesses.

CHARLES E. REYNOLDS.

Witnesses:
 THOMAS DUGAN,
 HARRY SMITH.